W. S. QUIMBY AND F. W. ROBINSON.
APPARATUS FOR BUILDING UP OBJECTS OF QUARTZ GLASS.
APPLICATION FILED NOV. 23, 1918.

1,314,212.

Patented Aug. 26, 1919.
5 SHEETS—SHEET 1.

Fig. 1.

Inventors
Walker S. Quimby
and Frederic W. Robinson
By Knight Bros.
Attorneys

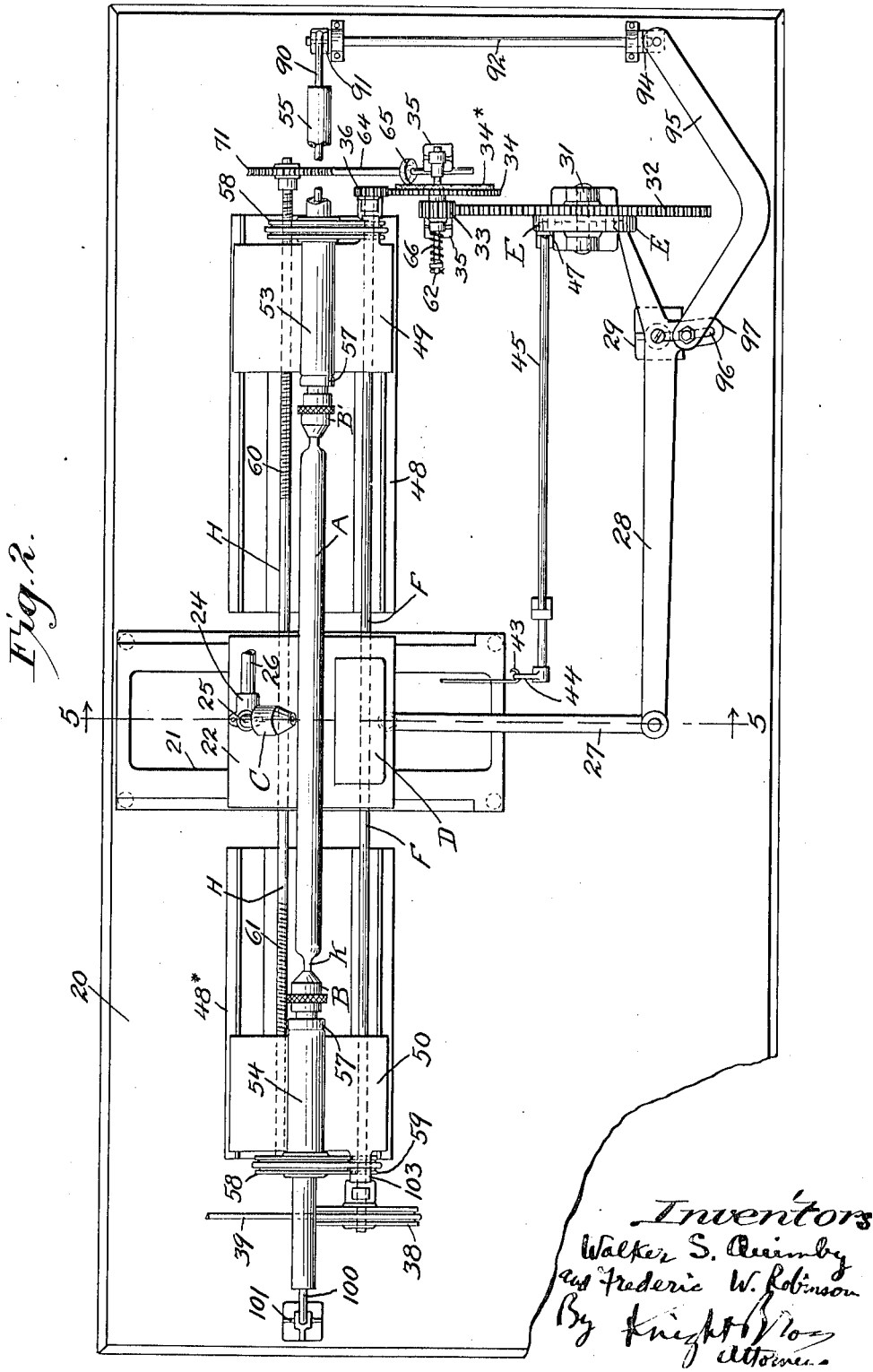

W. S. QUIMBY AND F. W. ROBINSON.
APPARATUS FOR BUILDING UP OBJECTS OF QUARTZ GLASS.
APPLICATION FILED NOV. 23, 1918.
1,314,212.
Patented Aug. 26, 1919.
5 SHEETS—SHEET 3.
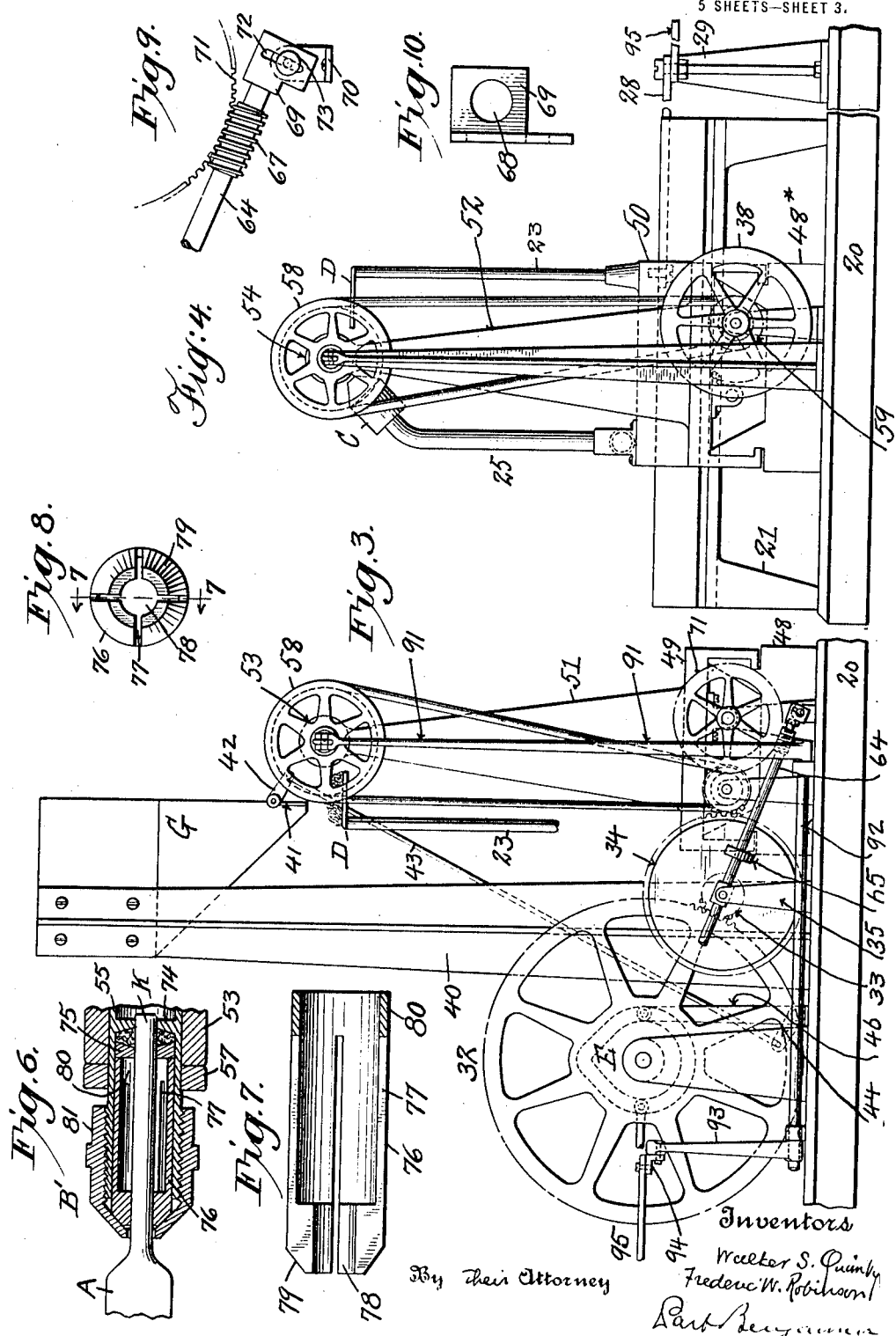

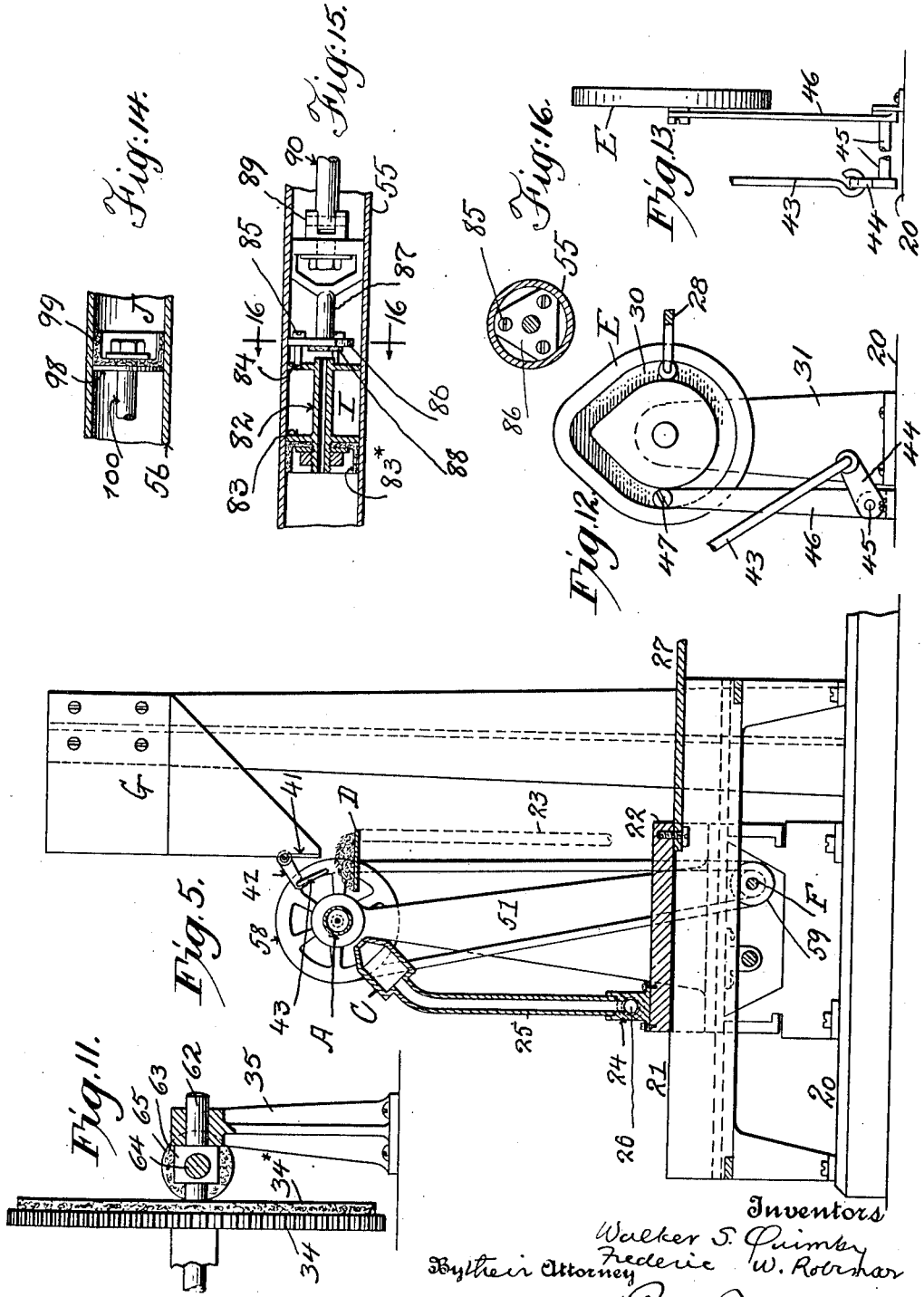

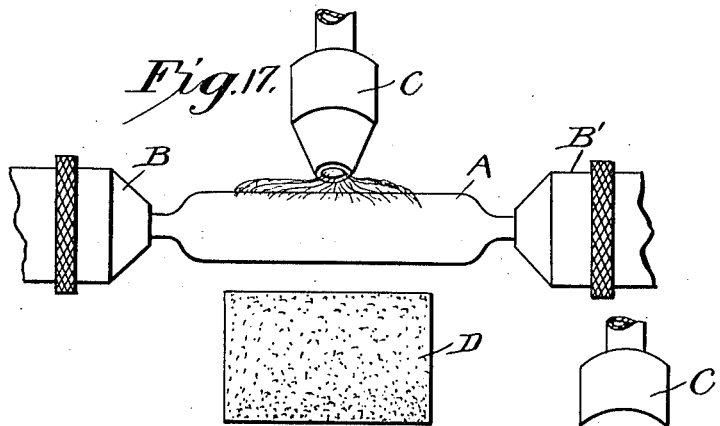
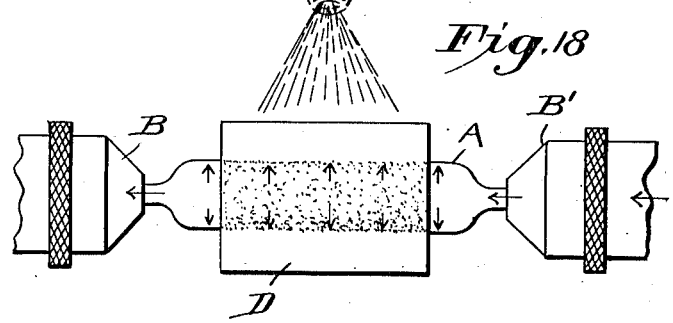
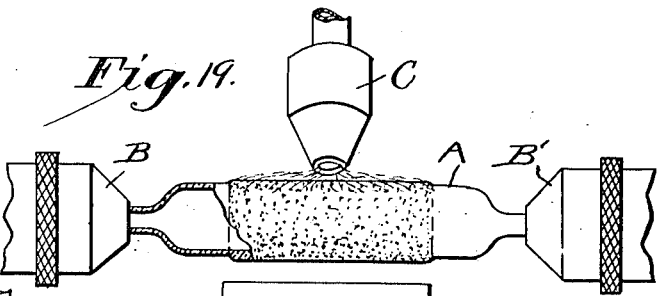
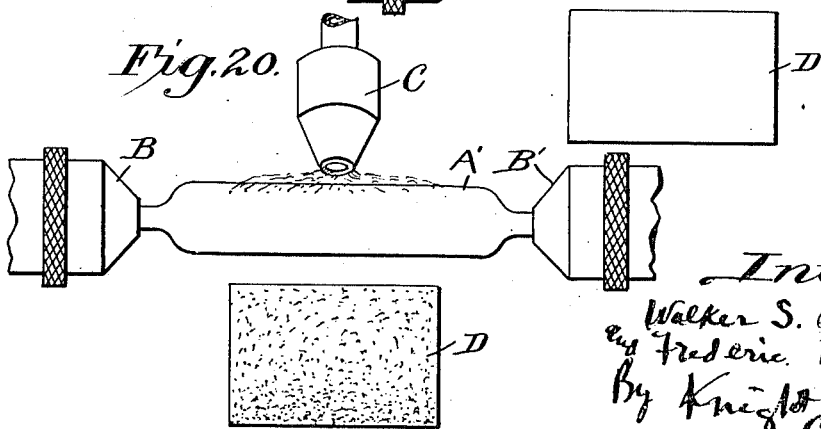

UNITED STATES PATENT OFFICE.

WALKER S. QUIMBY AND FREDERIC W. ROBINSON, OF NEWARK, NEW JERSEY, ASSIGNORS TO HANOVIA CHEMICAL & MANUFACTURING COMPANY, OF NEWARK, NEW JERSEY, A CORPORATION OF NEW JERSEY.

APPARATUS FOR BUILDING UP OBJECTS OF QUARTZ GLASS.

1,314,212.  Specification of Letters Patent.  Patented Aug. 26, 1919.

Application filed November 23, 1918. Serial No. 263,820.

*To all whom it may concern:*

Be it known that we, WALKER S. QUIMBY, a citizen of the United States, and FREDERIC W. ROBINSON, a subject of the King of Great Britain, residing at Newark, in the county of Essex and State of New Jersey, have invented a certain new and useful Improvement in Apparatus for Building Up Objects of Quartz Glass, of which the following is a specification.

The invention is an apparatus for building up an object of quartz glass into predetermined form. Transparent quartz glass (pure fused silica) is used in chemical industries in the shape of rods or tubes. Hitherto these have been produced by simply drawing out a block of quartz glass heated to a plastic condition. This is expensive and involves much skill.

We make the desired object by building it up from quartz powder upon an initial nucleus of quartz glass heated to a plastic state. To this end the heated nucleus is brought into contact with a mass of said quartz powder and preferably rotated therein, so that an accretion of said powder is caused to surround and adhere to said nucleus. The nucleus with its adherent accretion is then reheated, whereby the adherent powder becomes fused and vitrified and so in the shape of glass becomes incorporated in and an integral part of said nucleus. During this operation the plastic work is elongated, so that the incorporated accretion is made to add to the length thereof. If the object is to be a tube, the initial nucleus is primarily made in tubular form, and in order to prevent thickening or deformation of the wall thereof, the air within said tube is compressed while the tube in plastic state is in contact with the quartz powder, so that said compressed air forms an internal support for said wall.

The invention further consists in the various combinations and instrumentalities embodied in said apparatus, timed and operating as hereinafter more particularly set forth.

In the accompanying drawings—

Figure 1 is a front elevation of our apparatus.

Fig. 2 is a plan view of said machine.

Figs. 3 and 4 respectively are elevations of the right hand end and the left hand end of the apparatus.

Fig. 5 is a section on the line 5, 5 of Fig. 2. Fig. 6 is a longitudinal section of one of the holding chucks B or B'. Fig. 7 is an enlarged longitudinal section, on the line 7, 7 of Fig. 8, of the clamping spring in said chuck. Fig. 8 is an elevation of the outer end of said spring. Fig. 9 is a side elevation of the worm transmission gear. Fig. 10 shows the bracket 69 separately.

Fig. 11 is an elevation of the gear 34 and roller 65. Fig. 12 is a face view and Fig. 13 an edge view of cam E and parts operated thereby.

Fig. 14 is a longitudinal section of the fixed piston. Fig. 15 is a longitudinal section of the movable piston. Fig. 16 is a section on the line 18, 18 of Fig. 15.

Figs. 17, 18, 19 and 20 are all illustrative enlarged plan views of the tubular object treated, disposed in its tubular holding chucks, the burner for heating said object and the plate which carries the powdered quartz, and generally illustrate the operating cycle.

Similar letters and numbers of reference indicate like parts.

Referring to Figs. 17, 18, 19, 20:

A, Fig. 17 is the initial nucleus of quartz-glass, here in tubular shape, held at its ends in chucks B, B' and rotated on its longitudinal axis. Respectively located on opposite sides of the nucleus are a gas burner C and a plate D, upon which plate is placed a quantity of powdered quartz. The burner C and plate D are to be supported so that they move to and fro in a direction at right angles to the longitudinal axis of the nucleus A.

In Fig. 17 the flame from burner C is operating upon the nucleus A. The nucleus is being rotated in said flame and is rendered soft and plastic thereby.

In Fig. 18 the burner C has moved away from the nucleus A and the plate D has consequently moved under said nucleus, so that said nucleus now is in contact with the quartz powder on said plate. This powder, by reason of the hot and softened condition of the nucleus, adheres to the surface thereof, and, as the nucleus rotates, forms a band, as shown in Fig. 18, around the nucleus periphery.

In Fig. 19 the burner C has again moved up to the nucleus A and the plate D has moved away therefrom. The nucleus with the accretion of quartz powder adherent thereto is thus again heated, and the powder is fused and vitrified and so becomes integrally incorporated with the material of the nucleus. At the same time the work is elongated by drawing its ends asunder to an extent sufficient to compensate for the added bulk of powder. That is to say, each successive increment or accretion of quartz powder is fused, vitrified and added to the length of the work. The operation, as described, is repeated as often as may be desired until by reason of the incorporation of the successive accretions of quartz powder the work is brought to a predetermined length.

In Fig. 20 the work has become lengthened, as will be seen by comparing its length as shown at A' in Fig. 20 with the length of the initial nucleus A only in Fig. 17. Said lengthened work then becomes a new and enlarged nucleus to be brought into contact with the powder on plate D to receive another accretion of said powder.

While the tubular work is in contact with the powder, as shown in Fig. 18, in order to support the hot and plastic walls and to prevent thickening of them we may admit compressed air into the work as indicated by the arrows on said figure.

We will now describe the apparatus in detail.

*The mechanism for supporting and moving the burner C and quartz receiving plate D with reference to the nucleus A.*

On the bed 20, Fig. 1, of the apparatus are transverse fixed ways 21 which support the sliding carriage 22. In a socket on said carriage is seated the vertical rod 23 which carries plate D. In the upper portion of a socket 24, also on carriage 22, is a tube 25 which carries the upwardly inclined burner C. Communicating with the socket 24 is a pipe 26 which leads to the source of gas supply, not shown. Because of the upward inclination of burner C (see Fig. 5) when said burner is moved away from nucleus A, the flame jet passes above the nucleus and, therefore, has very little effect thereon when said nucleus is in contact with the powdered quartz on plate D.

The carriage C is reciprocated by the following means: Pivoted to its under side is a link 27, Figs. 2 and 5, which is connected to one end of a lever 28 pivoted to a standard 29 on bed 20. The opposite end of said lever is globular and enters the face groove 30 of a cam E, Figs. 12, 13. The cam E is on the face of a toothed gear 32, Fig. 3, and the shaft of said gear is journaled in standards 31 on bed 20. Gear 32 engages with pinion 33 fast on the hub of a pinion 34 journaled in standards 35 on bed 20. Pinion 34 engages with pinion 36 on the main driving shaft F journaled in standards on bed 20, which shaft carries the driving pulley 38 driven from any suitable power source by belt 39. It will be obvious that as cam E rotates, the carriage C will be reciprocated, and by suitable shaping of the cam groove its operation will be timed, as more particularly hereinafter explained.

*The means for holding powdered quartz and delivering an intermittent supply thereof to plate D.*

Supported upon a standard 40 on bed 20 is a hopper G having at its lower tapered portion a door valve 41, Fig. 5, which when opened allows the quartz powder from said hopper to escape and fall upon the plate D, when said plate is moved into position below said hopper. This door is opened intermittently to permit a measured amount of said powder to fall upon plate D by the following mechanism: On the door pivot is an arm 42, Figs. 1 and 2, to which is connected one end of a long link 43, the other end being connected to an arm 44 on the extremity of rock shaft 45 supported in bearings on bed 20. On the opposite end of rock shaft 45 (omitted in Fig. 1 for clearness) is a lever 46, Figs. 12, 13, which carries a roller 47 which enters the groove 30 in cam E.

The rotation of cam E, therefore, (1) reciprocates carriage C to move burner B and plate D with reference to nucleus A, and (2) also causes at the proper times a quantity of powdered quartz to escape from hopper G upon plate D.

*The mechanism for rotating the tubular nucleus A on its longitudinal axis.*

The tube A, as we have stated, is held at its ends in chucks B, B', said ends being reduced in diameter, as best shown in Fig. 6.

On the bed 20, Figs. 1, and 2, and on opposite sides of the transverse ways 21 are longitudinal ways 48, 48* carrying respectively sliding carriages 49, Fig. 2, 50, Fig. 2. On said carriages are standards 51, 52 which support elongated shaft bearings 53, 54. Through said bearings pass hollow shafts 55, Fig. 3, 56, Fig. 2, which respectively carry the chucks B, B'. On each shaft in proximity to one end of its bearing is a collar 57 and in proximity to the other end of said bearing is a belt pulley 58. The two belt pulleys 58 are driven by belts from pulleys 59, Fig. 1, on the main driving shaft F, and as said pulleys 58 are alike, said shafts 55, 56 rotate synchronously. In this way the tube A is rotated in the flame of the burner and also in contact with the powder on plate F.

The mechanism for elongating the work while hot and plastic.

Extending through threaded openings in the carriages 49, 50 is a shaft H, Fig. 2, having reverse threads at 60, 61, and journaled in suitable standards on bed 20. When this shaft is rotated in proper direction, the carriages 49, 50 are moved asunder. This motion is effected by the following means, Fig. 11: On the shaft 62, Fig. 2, which carries pinion 34 is a block 63, Fig. 11 through which passes shaft 64 carrying a roller 65 which bears against a leather disk 34* fast on the face of pinion 34. On shaft 64 is a worm 67, Fig. 9. The end of the shaft beyond the worm is received in an opening 68 in a bracket 69 pivoted on a standard 70, Figs. 9 and 10. The worm 67 engages gear 71 which is on the end of screw shaft H, Fig. 2. Gear 34, therefore, rotates roller 65, and so worm shaft 64, and hence shaft H through pinion 71. The shaft 62 extends beyond one of its standards and is headed. A spiral setting out spring 66 is interposed between said standard and the shaft head and serves to hold the roller 65 in close frictional contact with the leather disk 34* on pinion 34.

In order to remove the worm 67 from engagement with pinion 71 when desired, we slot the bracket 69, as shown at 72, Fig. 9, and secure said bracket to standard 70 by a clamp screw 73 passing through said slot. By loosening screw 73 the end of worm shaft 64 may be raised or lowered to bring the worm 67 into or out of engagement with pinion 71. The worm would be disengaged after the work is completed in order to permit the carriages 49, 50 to be brought back to starting position in order to receive the next succeeding nucleus.

The chucks.

It will be obvious from the foregoing that the reduced extremities K of the work must be held in the chucks B, B' not merely with sufficient tightness to insure the rotation of said work on its longitudinal axis, but also so securely that when the chucks separate to elongate the plastic tube, said ends K will not be displaced in or escape from them. We have, therefore, devised the following construction, which is the same for both chucks:

In the hollow shaft 55 is a partition 74, Fig. 6, having a central opening to receive the reduced end K of the tube and made concave on its outer side to receive packing, which packing is held in position by a concave washer 75. In the end of the shaft 55 is inserted the cylindrical spring 76, Figs. 7 and 8, which here has four longitudinal slots 77. In the outer end of said spring there is a central opening 78, through which the reduced extremity K of the tubular work passes and in which said extremity fits, and said end is externally tapered, as shown at 79. This spring is inserted in shaft 55 until its unslotted end 80 gets a bearing on washer 75. The hollow shaft 55 is externally threaded to receive the chuck cap 81, and said cap is tapered to fit upon the tapered end of spring 76. When the cap 81 is suitably rotated it forces the spring 76 against washer 75 and causes said washer to compress the packing. At the same time the tapered cap presses together the slotted ends of the spring 76 and causes said ends to constrict the opening 78, so that the tube end K is clamped at two joints, namely, at the packed joint between partition 74 and washer 75, and at the slotted extremity of spring 76. This construction gives the chucks B, B' a very firm grip upon the ends K of the tube A which does not permit of any slipping of the latter when the chucks are moved to elongate said tube.

The mechanism for forcing air into the tube A. See Figs. 2, 18, 19, 20.

Within the hollow shaft 55 is a piston I, Fig. 15, which comprises a tube 82 with flanges 83, 84 thereon. The end of tube 82 extends beyond the flange 83 and is threaded. On said threaded end is the flanged disk 83* and a nut and washer for securing said disk in place. On the flange 84 are three headed bolts 85. A triangular plate 86 is loose upon said bolts and is secured to a yoke 87. On the inner face of plate 86 is a plate 88 of rubber. On the yoke 87 is a bracket 89 in which is pivoted one end of a link 90, Fig. 1. The other end of said link is pivoted to a lever 91, Fig. 1, which is fast upon the rock shaft 92 which is journaled in brackets on the bed 20. Also on said rock shaft is a lever 93, Fig. 3, having a short horizontal arm 94, Figs. 2, 3, on the upper end of which is pivoted one end of the bent link 95. The other end of link 95 is pivoted in a slot 96 formed in an offset 97 of the lever 28, Fig. 2. When the lever 28 is vibrated by the rotation of cam E, motion from said lever is transmitted by link 95 to rock shaft 92 and thence to link 90, whereby the piston I is caused to move within the hollow shaft 55. When said piston is operated to compress air in tube A, the yoke first moves to the left of Fig. 1 until the rubber plate 88 closes the end of tube 82. Then the whole piston moves bodily to the left, thus forcing air into tube A. When the yoke 87 is retracted, its first effect is to withdraw the rubber plate from the end of tube 82, so that the compressed air in tube A is allowed to escape therefrom through said tube 82 and around the edges of triangular plate 86, and so through the hollow shaft 55 to atmosphere.

In order to retain the compressed air within the tubular tube, we provide in hollow shaft 56, Fig. 14, a piston J formed of a flat metal disk 98 and a flanged disk 99 of fiber or other elastic material secured thereon. Said piston is carried by a rod 100, Fig. 2, secured to the upper end of a fixed standard 101, Fig. 1, on bed 20. The piston J, therefore, remains fixed in position, and the hollow shaft 56 when moved longitudinally slides upon said piston. When, therefore, the piston I makes its compression stroke, the air is compressed in the tubular work between pistons I and J, and when piston I is retracted, the air thus compressed escapes in the manner already described.

The belt pulleys 59 on main driving shaft F are keyed in slots in said shaft so as to be slidable thereon with the carriages 49, 50. The shaft F, Fig. 1, passes through a depending flange 102 on an offset 103 on the carriage 50 and a partition 104 adjacent thereto, and the belt pulley 59 lies in the space between said flange 102 and said partition 104, so that when the carriage 50 moves, it engages the pulley 59 to slide it on the shaft F. In this way the belt pulleys 59 on the driving shaft F are kept in line with the driven belt pulleys 58 on shafts 55 and 56.

The operation and timing is as follows:

The rotating nucleus A, being placed in the chucks B, B', is heated to a plastic state. The heating burner C being retracted, the quartz powder on plate D is moved into contact with said heated nucleus and forms an adherent band surrounding the same. While the tubular nucleus is in contact with the powder, a puff of compressed air is forced into said nucleus to support the softened wall thereof. The nucleus with its adherent accretion of quartz powder is returned to the burner flame and again heated to fuse and vitrify the said body and incorporate the same with said nucleus. This cycle is repeated as often as may be desired. From the time the nucleus is first heated and until the work is completed the elongating mechanism operates to draw out the ends of the work. After each retraction of the work to the heating means, the valve in hopper G is opened to deliver a measured amount of quartz powder upon plate D.

Instead of alternately moving the burner and the quartz powder to the work, we may move the work alternately to said burner and said powder. Instead of establishing contact between the work and the quartz powder, as described, we may project or spray the powder upon the heated work by means, for instance, of an air blast operating while the work is being heated or shortly after the work has been heated to the desired plastic condition. Instead of causing increased air pressure within hollow or tubular work by the stroke of a piston, we may force an air blast directly into said work by any other suitable means. We also do not limit ourselves to the heating means, namely, a gas flame, as herein specifically set forth, since we may use, for example, any suitable electrical heating device or a blow pipe jet.

By suitably varying the timing, the heating effect, the amount of powder accretion added, the period of the cycle of operation, and in the case of hollow work the degree of internal fluid pressure, we are able to produce a variety of different shapes—such, for example, as spherical or pear-shaped, or more or less elongated or tapering.

We apply herein the term "initial nucleus" to the previously prepared body of quartz glass. It is, of course, obvious that after each accretion has been incorporated, the work becomes a new nucleus for the next accretion.

We claim:

1. An apparatus for building up an object of quartz glass, comprising means for heating a nucleus of quartz glass to a plastic state, means for separating said nucleus from said heating means, means for applying to the surface of said heated nucleus an accretion of powdered quartz, and means for again subjecting said nucleus to said heating means to fuse and vitrify said accretion and incorporate the same in said nucleus.

2. An apparatus for building up an object of quartz glass, comprising means for heating a nucleus of quartz glass to a plastic state, means for separating said nucleus from said heating means, means for applying to the surface of said heated nucleus an accretion of powdered quartz, means for again subjecting said nucleus to said heating means to fuse and vitrify said accretion and incorporate the same in said nucleus, and means for elongating the work correspondingly to the cubic increase thereof due to said accretion.

3. An apparatus for building up by successive accretions an object of quartz glass, comprising means for supporting a nucleus of quartz glass, means for heating said nucleus to a plastic state, means for gradually elongating said heated nucleus, and means for alternately subjecting said nucleus during said elongation thereof to the action of said heating means and to contact with a mass of powdered quartz.

4. An apparatus for building up by successive accretions an object of quartz glass, comprising means for supporting a nucleus of quartz glass, means for rotating said nucleus, means for heating said nucleus to a plastic state, means for gradually elongating said rotating heated nucleus, and means for alternately subjecting said nucleus during said elongation thereof to the action of said heating means and to contact with a mass of powdered quartz.

5. An apparatus for building up an object of quartz glass, as set forth in claim 2, further including means for rotating the work, and the said means for elongating said heated work being constructed to increase the length of said work in the direction of its axis of rotation.

6. An apparatus for building up by successive accretions an object of quartz glass, comprising a fixed support for a nucleus of quartz glass, movable means for heating said nucleus, movable means for supporting a mass of powdered quartz, the said fixed support for said nucleus being disposed between said heating means and said powder supporting means, and means for moving said heating means and said powder supporting means alternately into proximity to said nucleus: whereby said nucleus is alternately heated and said powder is brought into contact with said heated nucleus to adhere thereto.

7. An apparatus for building up by successive accretions an object of quartz glass, comprising a fixed support for a nucleus of quartz glass, means for rotating said nucleus, a movable carriage, and, on said carriage and disposed on opposite sides of said support, a heating device for said nucleus and a support for a mass of powdered quartz, and means for reciprocating said carriage to bring said heating device into operating proximity and said mass of powdered quartz into contact proximity to said nucleus: whereby said nucleus is alternately heated and said powder is caused to adhere to said heated nucleus.

8. An apparatus for building up by successive accretions a hollow object of quartz glass, comprising means for supporting a hollow nucleus of quartz glass, means for rotating said nucleus, means for heating said nucleus to a plastic state, means for alternately subjecting said rotating nucleus to the action of said heating means and to contact with a mass of powdered quartz, and means for increasing air pressure within said heated nucleus, the said last-named means being timed to operate while said heated nucleus is withdrawn from the action of said heating means.

9. An apparatus for building up an object of quartz glass, comprising means for supporting and rotating a nucleus of quartz glass, a movable carriage, and, supported on said carriage, a heating device and a horizontal plate for carrying a mass of powdered quartz, the said device and said plate being located on opposite sides of said nucleus, a rotary cam and transmission mechanism between said cam and said carriage, whereby the rotation of said cam is converted into reciprocating motion of said carriage to move said heating device into operative proximity and said mass of powdered quartz into contact proximity to said rotating nucleus.

10. An apparatus for building up an object of quartz glass, as set forth in claim 1, further including two rotary shafts in line, means at the facing ends of said shafts for engaging and supporting said nucleus, and means for moving said shafts longitudinally asunder, whereby said heated nucleus is elongated in the direction of its axis of rotation.

11. An apparatus for bulding up a cylindrical object of quartz glass, as set forth in claim 1, further including chucks engaging opposite ends of said nucleus, rotary shafts in line supporting said chucks, and means for moving said shafts longitudinally asunder, whereby said heated nucleus is elongated in the direction of its axis of rotation.

12. An apparatus for building up a tubular object of quartz glass, as set forth in claim 1, further including two hollow rotary shafts in line, means at the facing ends of said shafts for engaging and supporting said nucleus, means within one of said shafts for closing the bore thereof, and means for forcing air under pressure through the other of said shafts and into said nucleus.

13. An apparatus for building up a hollow object of quartz glass, as set forth in claim 1, further including two tubular rotary shafts in line and communicating with the interior of said nucleus, means at the facing ends of said shafts for engaging and supporting said nucleus, means within one of said shafts for closing the bore thereof, and mechanism within the other of said shafts for compressing the air in said tubular nucleus.

14. An apparatus for building up a tubular object of quartz glass, as set forth in claim 13, the said air compressing means being a stationary piston within one of said shafts for closing the bore thereof, and mechanism within the other of said shafts for compressing the air in said tubular nucleus.

15. In an apparatus of the type set forth, two rotary shafts in line for engaging, supporting and rotating the work, means for heating said work to render the same plastic, two sliding carriages respectively supporting said shafts, mechanism for moving said carriages in opposite directions, mechanism for actuating said moving mechanism, and disconnecting mechanism interposed between said actuating mechanism and said moving mechanism.

16. In an apparatus of the type set forth, two rotary shafts in line for engaging, supporting and rotating the work, means for heating said work to render the same plastic, two sliding carriages respectively supporting said shafts, a shaft having threads engaging in threaded openings in said carriages to move said carriages in opposite directions, a pinion on said threaded shaft, a worm, mechanism for rotating said worm, and means for adjusting said worm into and out of engagement with said pinion.

17. In an apparatus of the type set forth, two tubular longitudinally movable rotary shafts in line, and supporting the tubular work, a transverse partition in each of said shafts having a washer facing said partition, packing between said partition and said washer, a cylindrical longitudinally slotted spring bearing at one extremity upon said washer, the opposite and outer extremity of said spring being tapered, and a cap fitting upon said tapered extremity and internally threaded to engage a thread on said shaft; the said work passing through said cap, spring, washer, packing and partition.

In testimony whereof we have affixed our signatures in presence of two witnesses.

WALKER S. QUIMBY.
FREDERIC W. ROBINSON.

Witnesses:
GERTRUDE T. PORTER,
MAY T. MCGARRY.